United States Patent [19]

Tsuchiya et al.

[11] 4,242,073
[45] Dec. 30, 1980

[54] INJECTION MOLDING APPARATUS AND MOLDING METHOD WITH USE OF THE APPARATUS

[75] Inventors: Shiro Tsuchiya; Itsuo Imakita; Toshiaki Okumura, all of Kawaramachi, Japan

[73] Assignee: Hitachi Shipbuilding & Engineering Co., Ltd., Osaka, Japan

[21] Appl. No.: 902,847

[22] Filed: May 4, 1978

[30] Foreign Application Priority Data

May 13, 1977 [JP] Japan .................. 52/55659

[51] Int. Cl.³ .............................................. B29F 1/06
[52] U.S. Cl. .................................. 425/149; 425/555; 425/558; 425/562; 425/570; 425/572
[58] Field of Search ............... 425/555, 560, 564, 572, 425/558, 562, 570, 149

[56] References Cited

U.S. PATENT DOCUMENTS 3,819,313  6/1974  Josephson ................ 425/564 X

FOREIGN PATENT DOCUMENTS

839015  6/1960  United Kingdom ............. 425/562

*Primary Examiner*—Thomas P. Pavelko
*Attorney, Agent, or Firm*—Whittemore, Hulbert & Belknap

[57] ABSTRACT

An apparatus comprising a resin plasticizing injection machine having an injection nozzle, a branch portion connected to the injection nozzle and having a plurality of outlet ports, molds and mold clamping devices both arranged around the branch portion in corresponding relation to the outlet ports, and an extension nozzle for maintaining each of the outlet ports in communication with each of the molds. Pressure control means is provided at an intermediate portion of the extension nozzle for maintaining the mold cavity at a specified pressure after resin has been injected into the mold. Means is provided for closing a flow channel extending from the injection machine to the pressure control means. After resin has been injected into a mold, the cavity of the mold can be maintained at the specified pressure by the pressure control means in place of the injection machine, so that the injection machine and the next mold can be subsequently brought into operation. Preferably resin is injected into one mold after another in succession in such a manner that the first mold is prepared for the injection of resin again before the injection machine is made ready for the injection into the first mold after completing the injection of resin into all the molds. The flow channel closing means comprises a shutoff valve mounted on each of the extension nozzles. The branch portion may comprise a branch valve for selectively opening or closing the flow channel.

9 Claims, 12 Drawing Figures

INJECTION MOLDING APPARATUS AND MOLDING METHOD WITH USE OF THE APPARATUS

The present invention relates to an injection molding apparatus and an injection molding method with use of the apparatus.

Injection-molded articles are usually produced with use of a mold fixedly mounted on a mold clamping device and a resin plasticizing injection machine provided for the mold, by injecting resin from the machine into the cavity defined by the mold clamped by the device, solidifying the molded piece by cooling and withdrawing the solid piece by opening the mold. According to this method, one injection machine is used for one mold, and the components of the overall molding apparatus must be operated in succession for the successive steps of the injection molding operation and are thus inefficient, resulting in an inefficient molding operation. Especially the low efficiency of the expensive injection machine is undesirable in view of productivity. Additionally the low operation efficiency entails losses of energy.

In order to ensure an improved efficiency for the production of small molded articles, it has been proposed to use a large-scale molding apparatus including a plurality of mold cavities for simultaneous injection or a mold clamping device of the rotary type. For the production of large moldings, however, the proposed apparatus involves technical as well as cost problems and is not usable.

The main object of this invention is to overcome the foregoing problems and to provide an injection molding apparatus which operates efficiently with a reduced energy loss.

To fulfill this object, this invention provides an injection molding apparatus comprising a resin plasticizing injection machine having an injection nozzle, a branch portion connected to the injection nozzle and having a plurality of outlet ports adapted to communicate with the injection nozzle, a plurality of molds arranged around the branch portion, an extension nozzle for maintaining each of the outlet ports in communication with each of the molds, pressure control means provided at an intermediate portion of the extension nozzle, and means for closing a flow channel extending from the injection machine to the pressure control means.

According to the construction described above, it is possible to inject resin into one mold after another in succession or into all the plurality of molds at one time, to close the flow channel by the closing means upon completion of injection, and to cause the pressure control means to maintain the internal pressure of the mold cavity or cavities at a level required for molding while permitting the injection machine and the next mold to perform the subsequent operation. Thus the plurality of molds can be operated at one time, or one at a time in succession. This leads to an increase in the operation efficiency of the injection machine at least in corresponding relation to the time during which the mold is maintained at the specified pressure required for molding. The maintenance of the molding pressure thus ensured renders the resulting molding free from sink marks which would otherwise occur due to shrinkage, giving a molding of good quality. As compared with use of a plurality of injection molding apparatus each including one mold, the present apparatus in which one injection machine is used for a plurality of molds is less expensive, more efficient to operate and lower in power capacity as well as in power consumption.

The branch portion can be in the form of a fixed member for maintaining the injection nozzle in communication with the outlet ports at all times or may comprise a valve for maintaining the injection nozzle selectively in or out of communication with all the outlet ports or with one port after another. Especially it is preferable that the branch portion be of the fixed type and that the closing means be a shutoff valve provided on the extension nozzle between the outlet port and the pressure control means. Alternatively it is preferable that the branch portion comprise a branch valve including a turnable valve disk for maintaining the injection nozzle in or out of communication with one of the outlet ports and serviceable also as the closing means, the branch valve being provided with drive means for intermittently turning the valve disk so as to maintain the injection nozzle in communication with one outlet port after another.

The present invention further provides a continuous injection molding method with use of the apparatus described, comprising the steps of operating the channel closing means to bring the injection nozzle of the injection machine into communication with a mold and to thereby inject resin into the mold, thereafter closing the closing means and causing the pressure control means to maintain the internal pressure of the cavity of the mold at a level required for molding while repeating these steps for the next mold after closing the closing means, further repeating the same steps for the other molds in succession, and preparing the first mold for the injection of resin again before the injection machine is made ready for the injection into the first mold after completing the injection of resin into all the molds.

According to this method, resin is molded and then cooled in a particular mold, and the solidified molding is withdrawn from the mold, which is thereafter closed by the mold clamping device and made ready for the subsequent injection of resin. In the meantime, resin is injected into other molds in succession. These steps are repeated for all the molds in a successive fashion, thus producing molded articles one after another. The method therefore enables the components of the apparatus to operate with an extremely high efficiency, achieves a high productivity and minimizes the energy loss involved. This leads to a 20 to 30% reduction in the power capacity of the apparatus as well as in power consumption.

Other features and advantages of this invention will become more apparent from the preferred embodiments and modifications thereof to be described below with reference to the accompanying drawings, in which:

Figure 4:
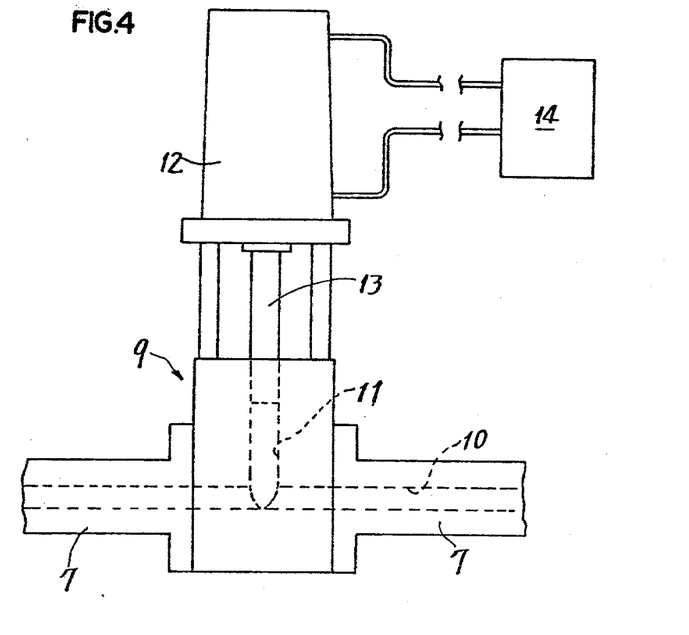
FIG. 4 is a side elevation showing pressure control means.

With reference to the embodiment shown in FIGS. 1 to 4, a resin plasticizer injection machine 1 receives resin from a hopper 2. A quantity of resin for each shot is plasticized by heating, then forced forward and discharged from an injection nozzle 3 at the front end of the machine 1. A branch member 4 is formed with a branch resin passage 5 (FIG. 3) having an inlet opening at the upper end of the member 4. The injection nozzle 3 has an open end (not shown) facing down and communicating with the inlet opening of the channel 5. The resin passage 5 comprises a main channel 5a communicating with the inlet opening and a plurality of horizontal channels 5b extending from the main channel 5a radially at equal angular spacing and communicating with outlet ports 6a to 6e. The outlet ports 6a to 6e are connected to the open base ends of extension nozzles 7a to 7e respectively. The forward ends of the extension nozzles 7a to 7e, respectively, are connected to molds fixed to mold clamping devices 8a to 8e of the vertical type which are arranged about the vertical axis X of the branch member 4 preferably at equal angular spacing along the same phantom circle. Pressure control means 9a to 9e are mounted on the extension nozzles 7a to 7e respectively, each approximately at the longitudinal midportion of the nozzle. As seen in FIG. 4, each of the pressure control means 9a to 9e comprises a cylinder chamber 11 communicating with the resin channel 10 of the extension nozzle and hydraulic piston-and-cylinder means 12 having a plunger 13 extending into the cylinder chamber 11. Under the control of hydraulic control means 14, the cylinder means 12 maintains the internal pressure of the cylinder 11 selectively at one of the pressure equal to the injection pressure of the injection machine 1, specified pressure required for molding and lower than the injection pressure, and zero pressure. First shutoff valves 15a to 15e, respectively, are provided near the junctions between the branch member 4 and the extension nozzles 7a to 7e. Second shutoff valves 16a to 16b are provided near the junctions between the extension nozzles 7a to 7e and the molds respectively. The injection nozzle 3 has a main shaftoff valve 17.

Figure 1:
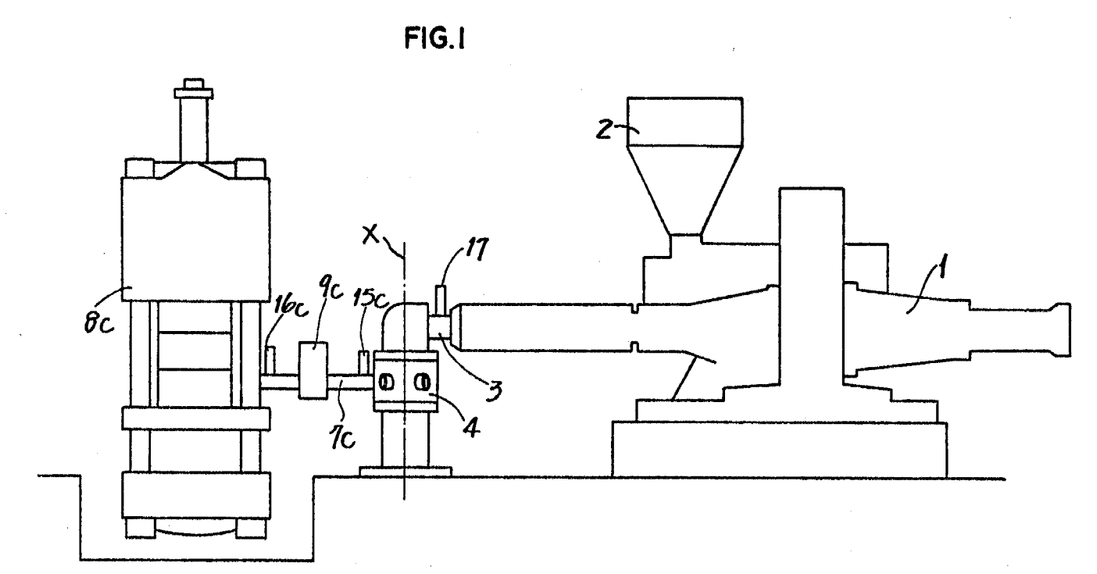
FIG. 1 is a side elevation showing an injection molding apparatus of this invention.
Figure 2:
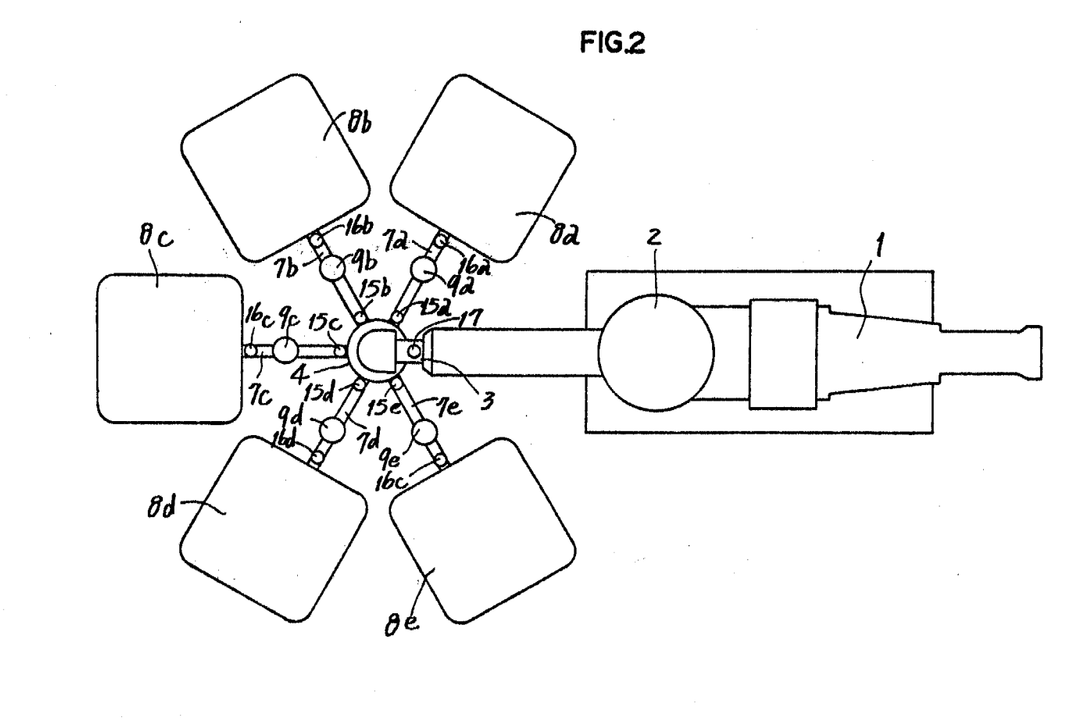
FIG. 2 is a plan view of FIG. 1.
Figure 3:
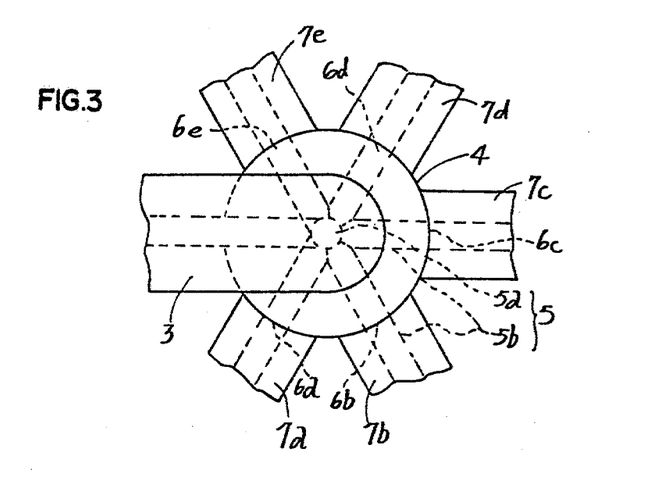
FIG. 3 is a plan view showing a branch portion of the fixed type.

The apparatus operates in the following manner. First, the injection machine 1 starts to plasticize the resin. Subsequently, the first shutoff valve on one of the extension nozzle 7a to 7e for the mold to be operated is opened. For example, the valve 15a on the nozzle 7a is opened. The plunger 13 of the hydraulic piston-and-cylinder means 12 of the pressure control means 9a advances into the cylinder chamber 11, thereby increasing the internal pressure of the cylinder chamber 11 and the resin channel 10 of the extension nozzle 7a to a level approximately equal to the injection pressure of the injection machine 1. In the meantime, plasticization of the resin proceeds in the machine 1, which starts to inject the predetermined amount of resin on completion of plasticization. With a slight delay, the main shutoff valve 17 opens, and the second shutoff valve 16a thereafter opens, whereupon the injection machine 1 injects the resin into the cavity of the mold at high pressure. The main shutoff valve 17 closes immediately on completion of the injection. The injection machine 1 starts to plasticize resin for the subsequent shot. Approximately simultaneously with the closing of the main shutoff valve 17, the first shutoff valve 15a also closes. After the closing of the valve 15a, or when a pressure sensor within the cavity detects that the internal pressure of the cavity has reached a proper level, a signal is sent to the hydraulic control means 14, which in turn applies an adjusted pressure to the hydraulic piston-and-cylinder means 12 with a suitable timing, whereby a predetermined pressure lower than the injection pressure and required for molding is applied to and maintained in the interior of the cylinder chamber 11, resin channel 10 and cavity mold. The maintenance of the pressure is required for preventing the shrink marks which would occur during the cooling of the resin unless the resin in the cavity is maintained under a suitable pressure for a given period of time following the injection. This pressure need not be as high as the injection pressure; such a high pressure, if applied, would cause the resin to seep through the clearance between the pair of mold segments, forming a flash. Thus an appropriate pressure lower than the injection pressure must be used. During the pressure maintaining step, the molten resin within the mold expands by being subjected to the pressure which is lower than the injection pressure, consequently raising the plunger 13 slightly. When the resin within the cavity has been completely molded on solidification, the cavity is relieved of the pressure exerted by the hydraulic piston-and-cylinder means 12, with the result that the internal pressure of the cavity reduces to zero. Subsequently, the second shutoff valve 16a is closed. After the molding has been cooled on the clamping device, the mold is opened to release the product, a release agent is applied to the mold, and the mold is clamped again. On the other hand, the injection machine, on completely plasticizing the resin therein, injects the resin to the mold on the next clamping device 8b in the same manner as above. Similarly injection molding operation is thereafter carried out in succession with the other molds. The first mold is prepared for the injection of resin before the injection machine becomes ready for the injection into the first mold again, with the internal pressure of the extension nozzle 7a raised by the pressure control means 9a to a level substantially equal to the injection pressure as already described. Through the repetition of the foregoing procedures, molded articles can be withdrawn from the molds in succession with a greatly improved efficiency.

The main shutoff valve 17 in the preferred embodiment described above can be dispensed with by permitting the first shutoff valves 15a to 15 e to serve also as such a valve. Whereas the second shutoff valves 16a to 16e enable the resin channels 10 of the extension nozzles 7a to 7e to have an increased pressure approximately equal to the injection pressure before the injection of resin for rapid injection, the second shutoff valves 16a to 16e can also be omitted if a reduction in the injection pressure in the initial stage is allowable, although some resin will then drip from the forward ends of the extension nozzles 7a to 7e when the molds are opened.

Figure 5:
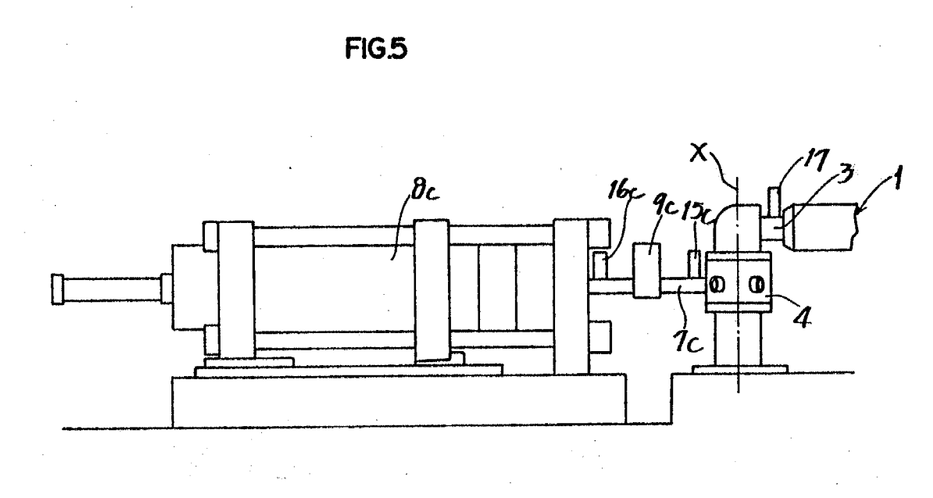
FIG. 5 is a fragmentary side elevation showing a modified embodiment including mold clamping devices of the horizontal type.
Figure 6:
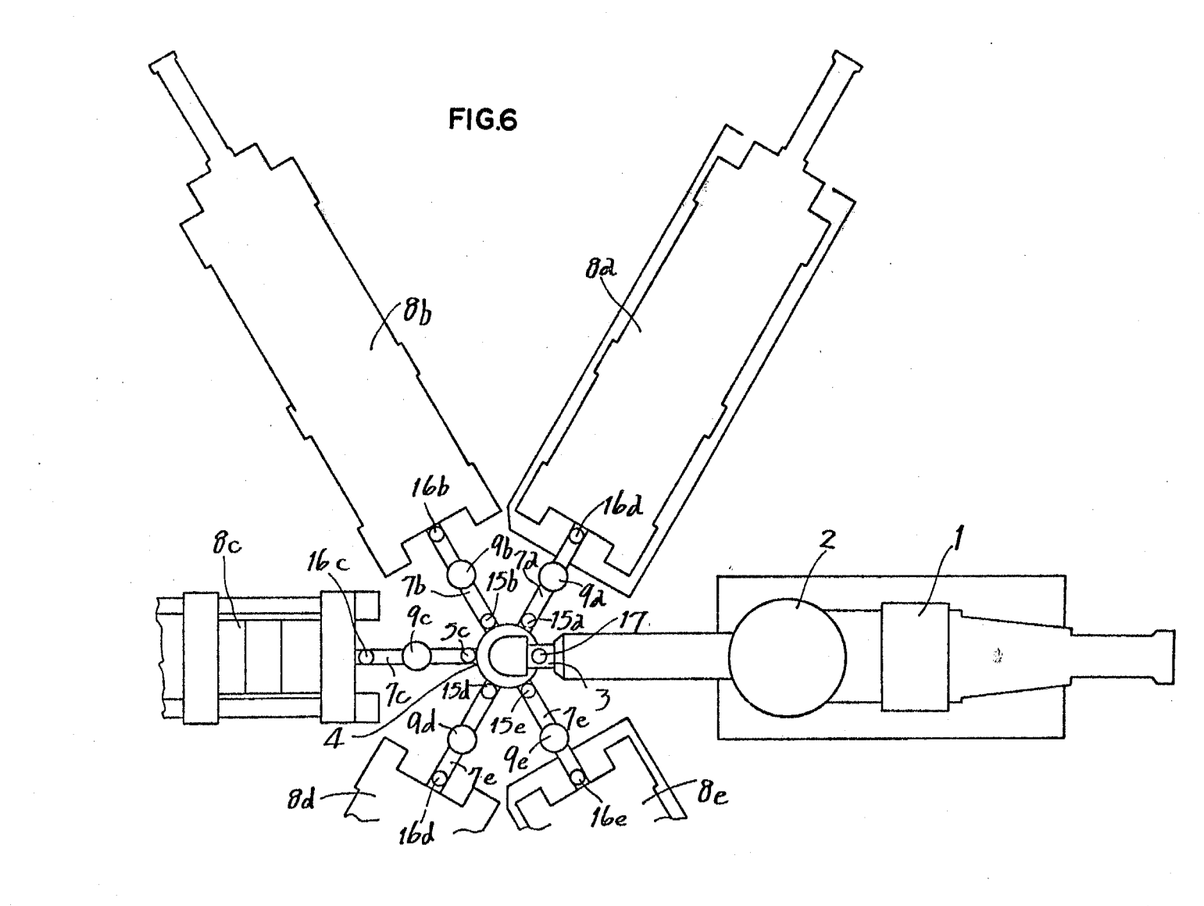
FIG. 6 is a plan view of FIG. 5.
Figure 7:
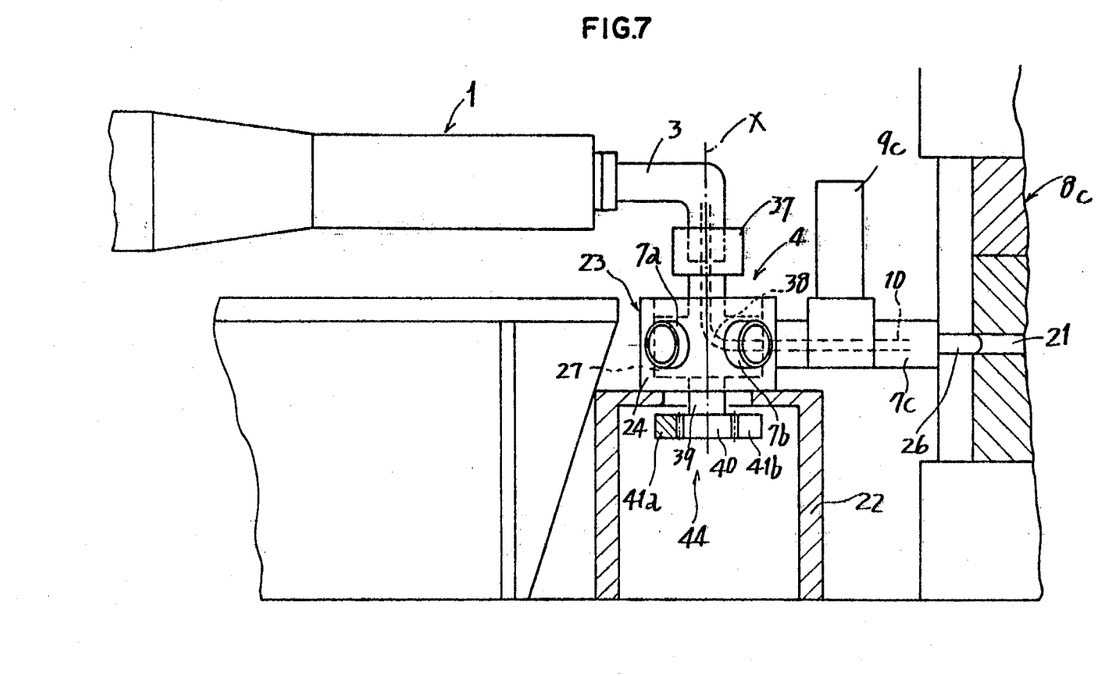
FIG. 7 is a fragmentary side elevation partly broken away and showing another modified embodiment including a branch valve serving as the branch portion.
Figure 8:
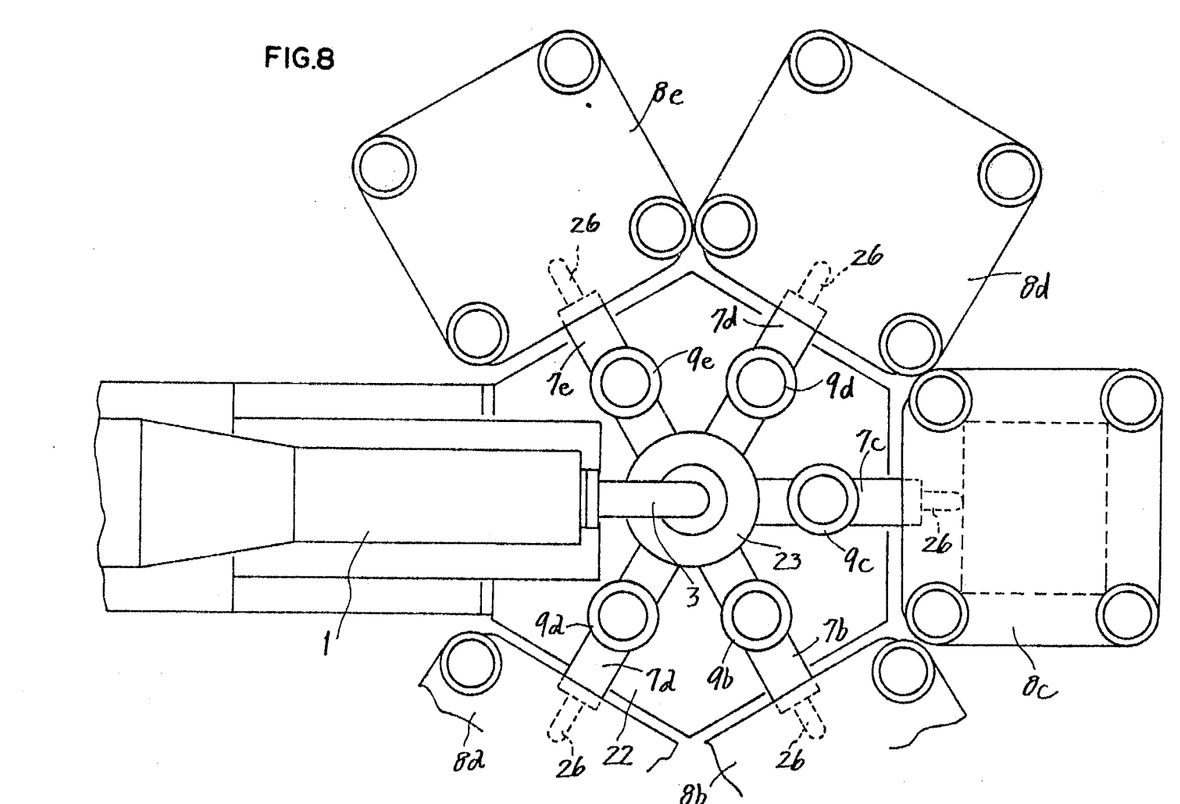
FIG. 8 is a plan view of FIG. 7.

This invention can be embodied similarly for use with the mold clamping devices 18a to 18e of the horizontal type shown in FIGS. 5 and 6.

Figure 9:
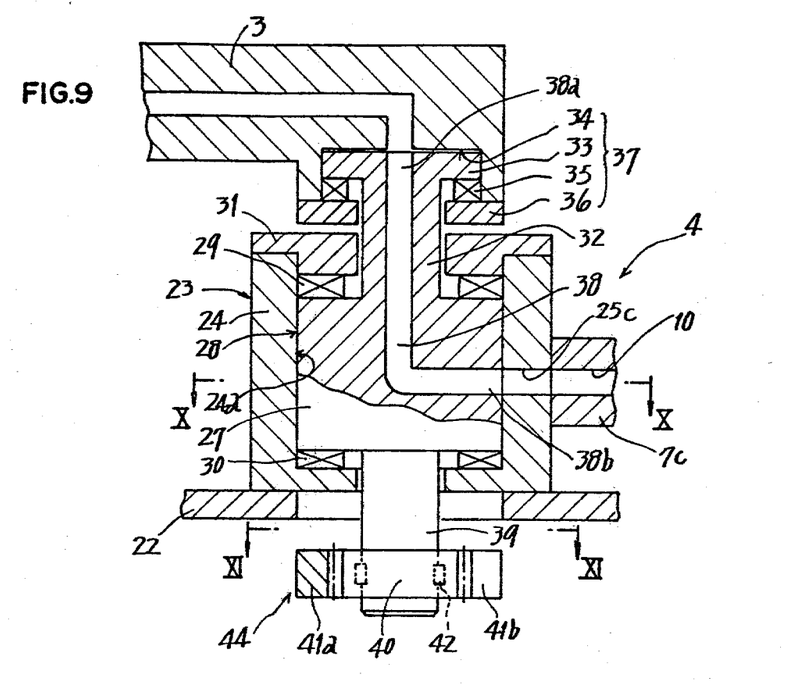
FIG. 9 is a view in vertical section showing the branch valve.

Another embodiment of this invention will be described below with reference to FIGS. 7 to 11. The branch portion of the embodiment comprises a branch valve 23 for bringing an injection nozzle 3 into or out of communication with one of extension nozzles 7a to 7e selectively in succession, the branch valve thus serving also as the first shutoff valves 15a to 15e described above. Throughout the drawings, like parts are referred to by like reference numerals and will not be described. The injection nozzle 3 is bent in the form of a hook to provide a downwardly open end on a vertical axis X. The same mold clamping devices 8a to 8e as used in the first embodiment are arranged around the axis X and fixedly provided with molds. The mold cavities are in communication with resin inlets 21 which are opened to the vertical axis X. A support 22 polygonal in plan is surrounded by the mold clamping devices 8a to 8e. The branch valve 23 mounted on the support 22 has an axis of its turn in coincidence with the vertical axis X. As is best illustrated in FIG. 9, the branch valve 23 includes a bottomed cylindrical casing 24, from the outer periphery of which the extension nozzles 7a to 7e extend radially toward the resin inlets 21. The casing 24 is formed with outlet ports 25a to 25e for the resin channels 10 of the extension nozzles 7a to 7e. The extension nozzles 7a to 7e are provided at their forward ends with nozzle elements 26 extending into the resin inlets 21. Pressure control means 9a to 9e are mounted on intermediate portions of the extension nozzles 7a to 7e respectively.

The branch valve 23 comprises a valve disk 27 accommodated in the casing 24 and having an outer peripheral surface 28 slidable in intimate contact with the inner peripheral surface 24a of the casing 24. The valve disk 27 is provided at its upper and lower ends with seal members 29 and 30 fitting in the casing 24 for sealing the slidable surface 28. A cap 31 seals the casing 24.

The valve disk 27 is made integral with a top flange 33 by a neck 32 extending through the cap 31. The flange 33 fits in a recess 34 formed in the forward end of the injection nozzle 3 of the injection machine 1, with the outer periphery and upper end of the flange 33 adapted for intimate sliding contact with the peripheral wall and bottom face of the nozzle end defining the recess 34. Indicated at 35 is a seal member for sealing the sliding portions, and at 36 a retainer for the seal member 35. Another seal member can of course be provided between the recessed bottom face and the top face of the flange 33. These elements provide a rotary joint 37 between the upper end of the valve disk 27 and the forward end of the injection nozzle 3.

Figure 10:
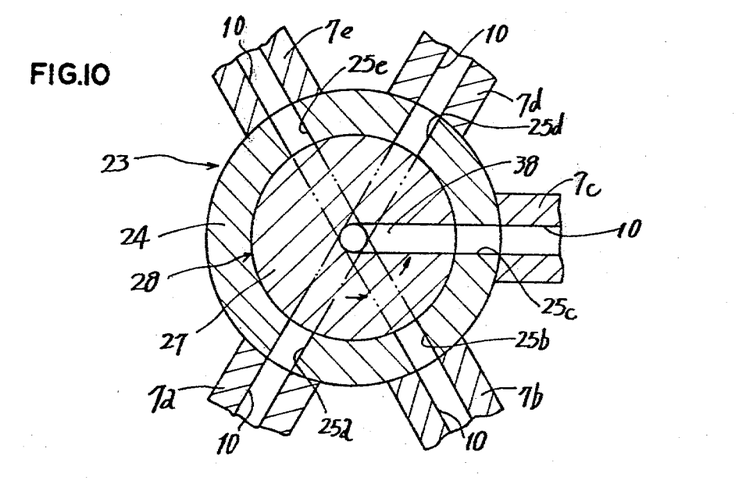
FIG. 10 is a plan view in cross section taken along the line X—X in FIG. 9.

The valve disk 27 is formed with a channel 38 having a starting end 38a coaxial therewith as at X and a terminal end 38b adapted for communication with one of the outlet ports 25a to 25e formed in the peripheral wall of the casing 24 and arranged at equal angular spacing about the axis X. Accordingly the starting end 38a of the channel 38 is in communication with the forward end opening of the injection nozzle 3 at all times, while the terminal end 38b is selectively intermittently brought into communication with the resin channel 10 of one of the extension nozzles 7a to 7e with the turn of the valve disk 27.

Figure 11:
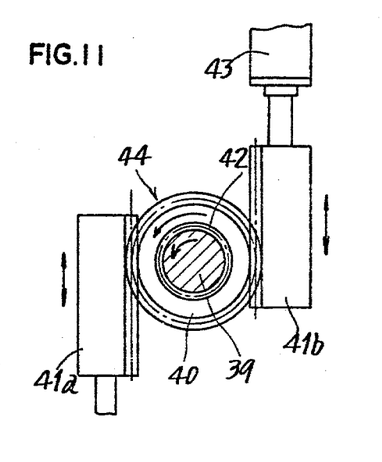
FIG. 11 is a plan view in cross section taken along the line XI—XI in FIG. 9.

A shaft 39 coaxial with the valve disk 27 as at X extends downward from the lower end of the disk 27 through the bottom wall of the casing 24. The shaft 39 has at its lower end a pinion 40 meshing with a pair of opposite racks 41a and 41b. One-way turning clutch 42 comprising, for example, a ratchet mechanism is provided between the shaft 39 and the pinion 40. The racks 41a and 41b are reciprocally movable in opposite directions over a predetermined distance by the forward and backward movement of piston-and-cylinder means 43, whereby the valve disk 27 is intermittently turnable in one direction through the specified angular spacing at a time to selectively bring the channel of the injection nozzle 3 into communication with the resin channel 10 of one of the extension nozzles 7a to 7e though the channel 38. Thus the shaft 39, one-way clutch 42, pinion 40, racks 41a and 41b and piston-and-cylinder means 43 provide drive means 44 for intermittently turning the valve disk 27.

Although the injection nozzle 3 is not provided with the main shutoff valve 17 with no second shutoff valves provided on the forward ends of the extension nozzles 7a to 7e, the second embodiment may preferably include such valves as in the first embodiment.

Figure 12:
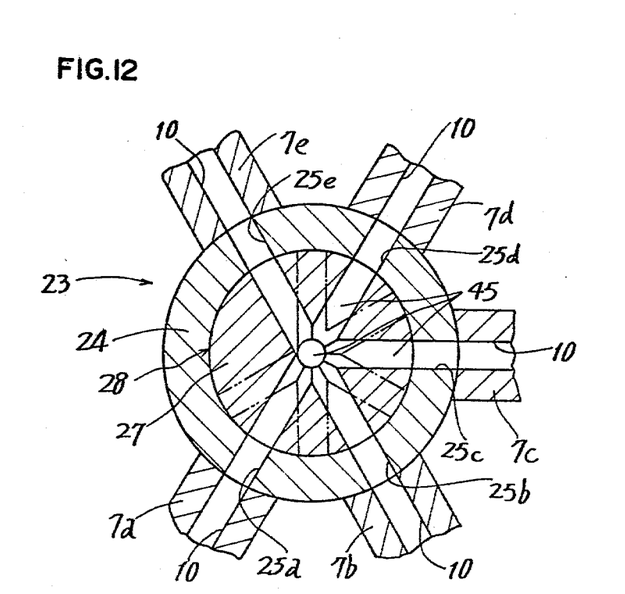
FIG. 12 is a view similar to FIG. 10 and showing a modification of the branch valve.

The channel of the injection nozzle 3 need not always be adapted for selective communication with one of the resin channels of the extension nozzles 7a to 7e. Alternatively, the valve disk 27 may be formed with a channel 45 having a base end communicating with the forward end opening of the injection nozzle 3 and radially branched terminal ends for the outlet ports 12a to 12e so as to bring the channel of the injection nozzle 3 into communication with the resin channels 10 of all the extension nozzles 7a to 7e as indicated in the solid line or to hold the injection nozzle channel out of communication with the resin channels 10 as indicated in the phantom line (see FIG. 12). With this arrangement, all the molds are used at the same time for molding operation, at least permitting the injection machine to operate with an improved efficiency. Since the channel of the injection nozzle 3 is held separated by the branch valve 23 from the resin channels 10 of the extension nozzles 7a to 7e during the steps of molding, withdrawing moldings and clamping, the resin can be plasticized in advance so that the injection machine may start to inject the resin upon the turn of the valve disk 27 immediately after the molds have been clamped to thereby achieve an improved efficiency. A similarly improved efficiency is achievable also with the use of the branch portion 4 of the fixed type shown in FIG. 3 with the main shutoff valve 17 provided on the injection nozzle 3.

What is claimed is:

1. An injection molding apparatus comprising a resin plasticizing machine having an outlet nozzle, a branch portion connected to the outlet nozzle and having a plurality of outlet ports adapted to communicate with the outlet nozzle, a plurality of molds arranged around the branch portion, an extension nozzle for maintaining each of the outlet ports in communication with each of the molds, means for closing the extension nozzle, and means for injecting the plasticizing resin to the mold, characterized in that (a) there is a resin plasticizing injection machine having an injection nozzle connected to the branch portion, (b) the injection nozzle is provided with a main shutoff valve at its forward end, (c) the extension nozzle is provided with a second shutoff valve at its foward end, (d) pressure control means is provided on the extension nozzle at a position between the closing means and the second shutoff valve, and (e) said closing means is located between said main shutoff valve and said pressure control means.

2. An injection molding apparatus as defined in claim 1 wherein the branch portion comprises a fixed member having a channel for maintaining the injection nozzle in communication with all the outlet ports, and the closing means comprises a shutoff valve provided on the extension nozzle between the outlet port and the pressure control means.

3. An injection molding apparatus as defined in claim 1 wherein the branch portion comprises a branch valve including a turnable valve disk for maintaining the injection nozzle in or out of communication with the plurality of outlet ports, the branch valve being serviceable also as the closing means.

4. An injection molding apparatus as defined in Claim 3, wherein the valve disk is provided with a channel having one end communicating with the injection nozzle and the other end adapted for communication with all the outlet ports.

5. An injection molding apparatus as defined in claim 3 wherein the valve disk is provided with a channel having one end communicating with the injection nozzle and the other end adapted to communicate with one of the outlet ports.

6. An injection molding apparatus as defined in claim 5, wherein the outlet ports are formed in the valve disk and arranged at a specified angular spacing about the axis of turning movement of the valve disk, and the branch valve is provided with drive means for intermittently turning the valve disk through the specified angular spacing at a time so as to bring the injection nozzle into communication with the outlet ports one after another.

7. An injection molding apparatus as defined in claim 6 wherein the drive means comprises a pinion mounted on the valve disk coaxially therewith with a one-way turning clutch provided therebetween and racks reciprocally movable in meshing engagement with the pinion.

8. An injection molding apparatus as defined in claim 1 wherein the pressure control means comprises a cylinder chamber communicating with the resin passage of the extension nozzle and hydraulic piston-and-cylinder means having a plunger extending into the cylinder chamber.

9. An injection molding apparatus as defined in claim 8 wherein the hydraulic piston-and-cylinder means maintains the internal pressure of the cylinder chamber selectively at one of the injection pressure of the injection machine, a specified pressure required for molding and zero pressure.

* * * * *